C. L. DRAKE.
CUSHION TIRE.
APPLICATION FILED APR. 16, 1909.
988,318.
Patented Apr. 4, 1911.
2 SHEETS—SHEET 1.
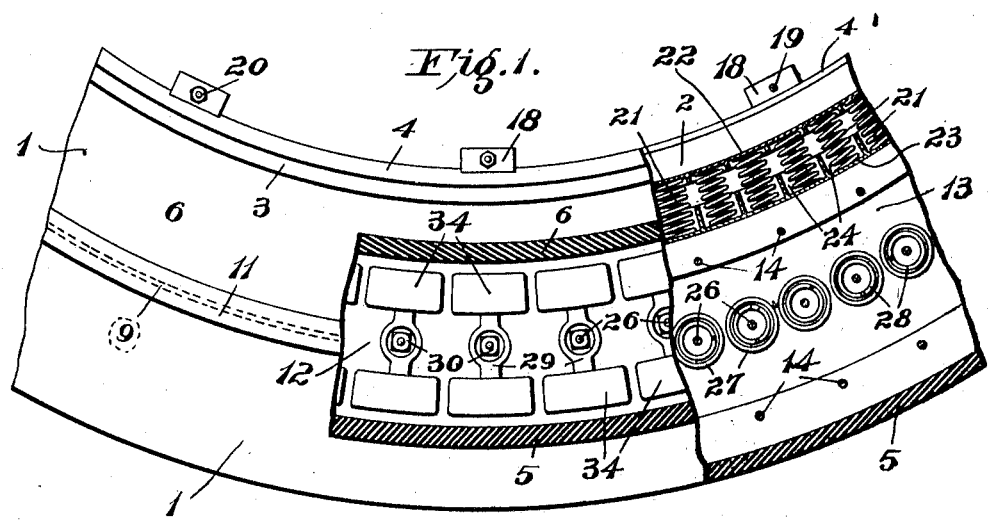
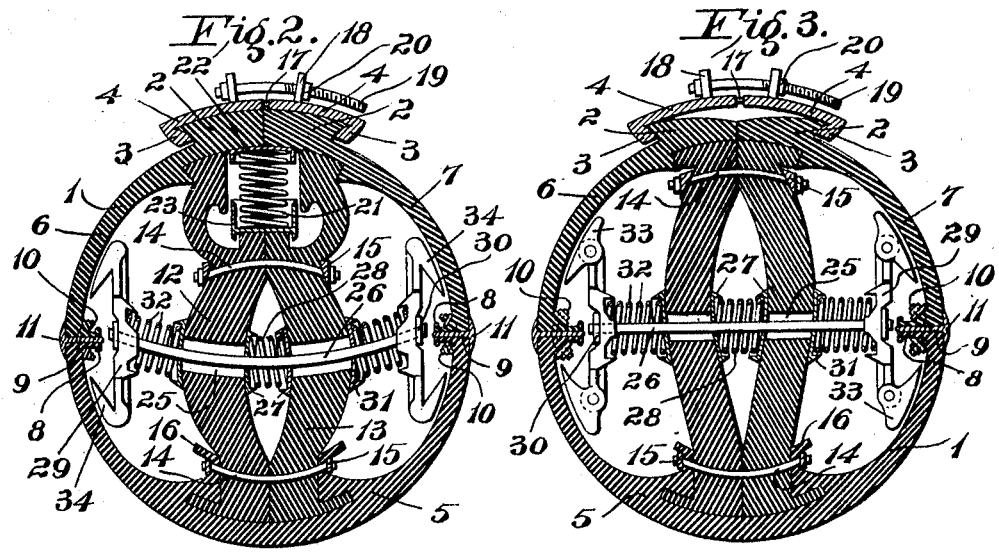
Witnesses:
Edgar T. Farmer.
G. A. Pennington.
Inventor:
Charles Leonard Drake
By Carr & Carr
attys.

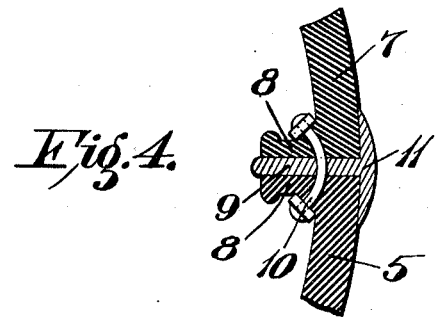
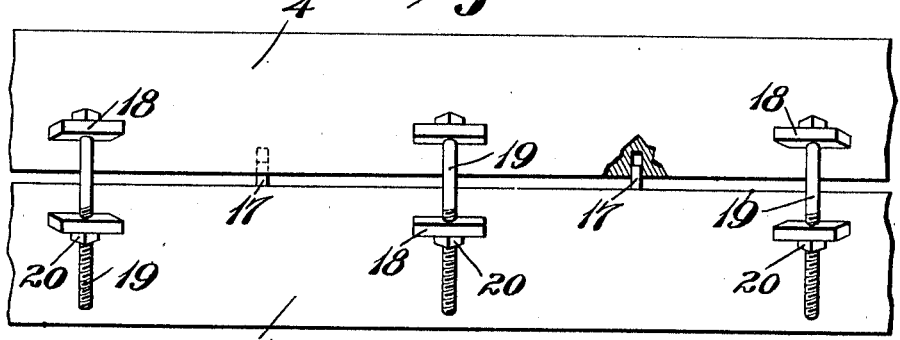
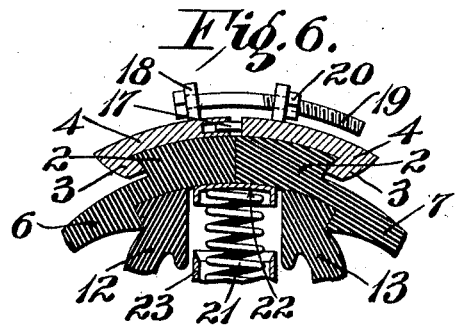

UNITED STATES PATENT OFFICE.

CHARLES LEONARD DRAKE, OF ST. LOUIS, MISSOURI.

CUSHION-TIRE.

988,318.  Specification of Letters Patent.  Patented Apr. 4, 1911.

Application filed April 16, 1909. Serial No. 490,261.

*To all whom it may concern:*

Be it known that I, CHARLES LEONARD DRAKE, a citizen of the United States, and a resident of the city of St. Louis and State of Missouri, have invented a new and useful Improvement in Cushion-Tires, of which the following is a specification.

This invention relates to cushion tires.

It has for its principal objects to produce a tire which will be suitable for the wheels of motor vehicles and the like, to provide against accidental collapse of the tire, to secure advantages of an ordinary pneumatic tire and to eliminate the disadvantages thereof, and to attain certain advantages hereinafter more fully appearing.

The invention consists in the parts and in the arrangements and combinations of parts hereinafter described and claimed.

In the accompanying drawing forming part of this specification and wherein like symbols refer to like parts wherever they occur,—

Figure 1 is a fragmentary view partly in side elevation and partly in section illustrating a tire embodying my invention; Fig. 2 is a cross section through the tire; Fig. 3 is a cross section of a modified construction of tire. Fig. 4 is a fragmentary section on an enlarged scale, showing the means for fastening the casing sections together; Fig. 5 is a fragmentary inside face view of the rim members; and Fig. 6 is a fragmentary section through the rim members and the portion of the tire which coöperates therewith.

The tire comprises a resilient tubular ring or casing 1 preferably of rubber and suitably reinforced by cloth or fabric in any desirable or well known manner. This tubular ring is provided with an annular rib 2 at the middle of its inner circumference, and the tube is slitted entirely around the middle of said annular rib 2 so that access may be gained to the interior of the tube. The sides of the ribbed portion 2 are suitably undercut to coöperate with counterpart flanged portions 3 of a metallic rim 4 through the intermediary of which the tire may be attached to the vehicle wheel in any ordinary manner.

Preferably, for convenience in manufacture, the tube or casing 1 comprises three separate sections 5, 6 and 7, respectively, the outer section 5 or tread member being substantially semicircular in cross section, and the two sections 6, 7 completing the tube. The meeting edges of section 5 and the two sections 6, 7, may be joined in any suitable manner. Preferably, however, it is desirable to form the meeting edges of the casing sections with continuous inturned ribs or flanges 8 and to insert between the sections metallic rings 9 which are perforated at regular intervals throughout to permit suitable rivets 10 or other suitable stitching or fastening devices for the tube sections to be passed therethrough. Preferably, the inner corners at the bases of the inturned flanges 8 are filleted and the rivets 10 are curved and passed through perforations in said filleted portions in order to more firmly secure the parts together. The metallic rings 9 serve to reinforce and to protect the edges of the tube sections 5, 6 and 7; and it is preferable to make the rings 9 substantially T-shape in cross section. By this arrangement the edges of the tube sections may be drawn tightly against the cross flanges 11 of the ring 9.

Extending around the middle portion of the casing or tube 1 is a substantially vertical, resilient partition or wall, which serves as a strut to resist the collapsing of the tire. This wall comprises two counterpart members 12 and 13 which are secured together near their inner and outer edges by rivets or tie members 14. The ends of these rivets 14 may be passed through perforated annular strips or members 15 and upset or otherwise secured on the outer faces thereof, or, if desired, individual washers may be provided for each rivet.

The inner and outer edge portions of the resilient partition are made to fit into counterpart undercut annular grooves which are provided in the interior face of the tube at the inner and outer side thereof. It is also preferable to secure the outer edge portion of the partition to the tube by passing the rivets 14 through undercut annular ribs 16 which are provided on the tread section 5 on both sides of the partition. The inner edge portion of the partition may be securely held in place by the arrangement of metal rim 4. As shown, the rim 4 is made in two sections and the meeting edge of one section is provided with a series of holes which are adapted to receive pins or studs 17 on the meeting edge of the opposite rim section. On each of the rim sections are provided a series of perforated lugs 18 which are arranged in oppositely disposed pairs, and through each pair of lugs is passed a threaded bolt 19 on which is mounted a nut 20 whereby the rims can be drawn together so as to firmly clamp the slitted portions of the casing together. These rim sections are so proportioned that their meeting edges will not be brought tightly together when the tire is clamped between the flanges 3 of the rim. In this way the nuts 20 on the bolts 19 may be occasionally tightened so as to take up any looseness due to shrinkage or wear of the portion of the tire which fits the rim.

In some cases the resiliency of the partition members 12, 13 alone will be sufficient to sustain the load upon the tire as shown in Fig. 3; but in many cases it may be desirable to provide a series or battery of springs between the inner edge portion of the partition and inner side of the tube as shown in Figs. 1 and 2. Preferably, coiled springs 21 are employed although it is obvious that other forms of springs may be substituted therefor within the spirit of my invention. It is also preferable to interpose annular channels or flanged metallic rings 22, 23, respectively, between the ends of the springs and inner face of the tube and between the opposite ends of the springs and edge of the partition. As shown, these rings or channels may be provided with transverse ribs so as to provide individual seats or pockets 24 for the respective springs 21.

The resilient partition members 12, 13 are normally bowed outwardly so that when weight is placed on the tire and the tread portion is pressed inwardly said members will bow further outwardly, the resiliency of the members being sufficient to restore the parts when the pressure is released. Ordinarily hardened rubber reinforced similarly to ordinary pneumatic tire casings will suffice when the following described arrangements of springs and devices are employed.

Preferably, the partition members 12, 13 are provided at regular intervals throughout with radially elongated holes 25 through which are loosely passed rods 26. Sleeved loosely on each of these rods between the members 12, 13 is a pair of flanged washers 27 between which are interposed a coiled spring 28. On the outer end portions of each of the rods 26 are slidably mounted shoes 29 which are retained thereon by heads 30 on the ends of the rods. Washers 31 are loosely sleeved on the rods next to the outer side of the respective partition members 13, 14 and between these washers and the slidable shoes 29 are interposed springs 32. In the form shown in Fig. 2 the rods 26 are curved outwardly, while in the modification shown in Fig. 3 said rods are straight. Also in Fig. 3 the shoes 29 are provided with pivoted end portions 33 which are adapted to conform with or compensate for the movements of the casing 1, while in Fig. 2 the shoes have rigid overhanging end portions 34 whose outer faces correspond to the normal curvature of the interior face of the casing.

The action of the tire in service is as follows: Normally, the parts assume the positions shown in the drawings. The intermediate springs 28 tend to prevent the normally bowed partition members 12, 13 from collapsing inwardly and the springs 32 normally hold the shoes outwardly and resist any tendency of the sides of the casing to collapse inwardly. When weight or pressure is placed upon the tire sufficiently to move the tread portion inwardly the resilient, normally bowed partition members 12, 13 will bow further outward against the tension of the springs 32; said springs 32 and the resiliency of the members 12, 13 themselves restoring the parts to normal position after the tire is relieved of the pressure. The arrangement of resiliently supported shoes adjacent to the sides of the casing also resists lateral or torsional stresses upon the tire whereby it is relieved of undue strains which tend to move the tire out of its true position with respect to the rim should the vehicle skid as in turning a corner or crossing a ridge at an acute angle.

By the construction shown the tire may be made resilient and even should the tube or casing become punctured, the tire will still be serviceable as air pressure is not depended upon to sustain the tube or casing distended. By making the casing in three sections as shown, any of said sections may be renewed or replaced without providing an entirely new tube.

Obviously my tire admits of considerable modification without departing from my invention, and, therefore, I do not wish to be limited to the specific constructions and arrangements shown and described.

What I claim is:

1. A cushion tire comprising a resilient tubular casing, a resilient strut comprising a pair of substantially vertical resilient partition members extending around the middle of the interior of the casing and adapted to bow outwardly when compressed edgewise, and resilient devices arranged within the casing and adapted to resist the collapsing of the sides thereof.

2. A cushion tire comprising a resilient tubular casing, a resilient strut comprising a pair of substantially vertical resilient partition members extending around the middle of the interior of the casing and adapted to bow outwardly when compressed edgewise, and oppositely disposed resilient devices arranged within the casing on opposite sides of said resilient strut and adapted to resist the outward bowing of the strut members and the collapsing inwardly of the sides of the casing.

3. A cushion tire comprising a resilient tubular casing, vertically-disposed, resilient distending members extending around the middle of the interior of the casing, said members being normally bowed outwardly, and resilient devices arranged between the bowed portions of said resilient distending members and the sides of said casing and adapted to resist the collapsing thereof.

4. A cushion tire comprising a resilient tubular casing, a pair of vertically-disposed, resilient distending members extending around the middle of the interior of the casing, a series of springs interposed between said resilient distending members, the tendency of said springs being to spread said members apart when pressure is placed edgewise upon said members, and resilient devices interposed between said resilient distending members and the sides of said casing, said devices being adapted to resist the outward collapsing of said resilient distending members and the inward collapsing of the sides of the casing.

5. A cushion tire comprising a resilient tubular casing, a pair of vertically-disposed, resilient distending members extending around the middle of the interior of said casing, said members being normally bowed outwardly, a series of springs interposed between the outwardly-bowed portions of said members and tending to spread the same apart, and resilient devices interposed between the outwardly-bowed portions of said distending members and the sides of said casing, said devices being adapted to resist the outward collapsing of said distending members and the inward collapsing of the sides of said casing.

6. A cushion tire comprising a resilient tubular casing, a resilient partition extending around the middle of the interior of said casing, a series of springs interposed between the inner edge portion of said partition and the rim portion of the casing, and a series of resilient devices arranged between the sides of said partition and the opposite sides of the casing, said devices being adapted to resist the inward collapsing of said sides of the casing.

7. A cushion tire comprising a resilient tubular casing, a pair of outwardly-bowed, resilient partition members extending around the middle of the interior of said casing, a series of springs interposed between the inner edge portions of said partition members and the rim portion of the casing, and resilient devices arranged between the sides of said partition members and the sides of the casing, said resilient devices being adapted to resist the outward collapsing of said partition members and the inward collapsing of the sides of said casing.

8. A cushion tire comprising a resilient tubular casing, a pair of outwardly-bowed partition members extending around the middle of the casing, said members being secured to the casing at their marginal portions, a series of springs interposed between the inner edge portions of said members and the rim portion of the casing, the bowed portions of each of said partition members being provided with a series of perforations therethrough, the perforations of one member registering with those of the other member, cross rods extending loosely through said perforations, a spring sleeved on each of said rods and interposed between said partition members, shoes slidably mounted on the end portions of said rods, stops on the ends of said rods for retaining said shoes thereon, and springs sleeved on said rods and interposed between said shoes and the partition members.

9. A cushion tire comprising a resilient tubular casing, a pair of normally outwardly-bowed partition members extending around the middle of the interior of the casing, said partition members being secured together near their margins, the marginal portions of said partition members being formed to interlock in counterpart seats provided in the adjoining portions of the casing, and each of said partition members being provided with a series of holes in their outwardly-bowed portions, cross rods loosely fitted in said holes and extending laterally beyond said partition members, springs sleeved on said rods between the partition members, shoes slidably mounted on the end portions of said rods and adapted to bear against the sides of said casing, and springs sleeved on said rod between said shoes and the adjacent partition members.

10. A cushion tire comprising a resilient tubular casing, said casing being made in three sections, namely, a semicircular tread section and two companion rim sections, the meeting edges of said tread section and the rim sections being secured together with an intervening metal reinforcing ring, and the meeting coöperating edge portions of said rim sections being provided with ribs having their outer sides arranged to interlock with counterpart portions of a clamping rim, a resilient partition extending around the middle of the casing, said partition comprising two companion normally outwardly-bowed members, and resilient devices interposed between the outwardly bowed portions of said partition members and the sides of the casing.

Signed at St. Louis, Missouri, this 13th day of April 1909.

CHARLES LEONARD DRAKE.

Witnesses:
G. A. PENNINGTON,
EDGAR T. FARMER.

Copies of this patent may be obtained for five cents each, by addressing the "Commissioner of Patents, Washington, D. C."